United States Patent [19]
Flores

[11] Patent Number: 5,863,054
[45] Date of Patent: Jan. 26, 1999

[54] GROCERY CART PLATFORM LIFT

[76] Inventor: Anthony Flores, 11849 Grande Vista Dr., Whittier, Calif. 90601

[21] Appl. No.: 726,309

[22] Filed: Oct. 2, 1996

[51] Int. Cl.⁶ .................................................. B62D 39/00
[52] U.S. Cl. ................................ 280/33.995; 280/33.992; 186/63
[58] Field of Search ......................... 280/33.991, 33.992, 280/33.995; 108/106; 211/207, 41.2; 186/63, 29

[56] References Cited

U.S. PATENT DOCUMENTS

| | | | |
|---|---|---|---|
| 2,802,575 | 8/1957 | Harrison ................................... | 108/106 |
| 2,812,187 | 11/1957 | Nicholl et al. . | |
| 2,958,536 | 11/1960 | Young . | |
| 3,437,176 | 4/1969 | Ruttenberg et al. . | |
| 3,456,763 | 7/1969 | Close . | |
| 3,513,944 | 5/1970 | McConnaughhay . | |
| 3,751,059 | 8/1973 | Dunder et al. ..................... | 280/33.992 |
| 3,787,063 | 1/1974 | Oliver . | |
| 3,924,709 | 12/1975 | Swanson . | |
| 4,118,044 | 10/1978 | Celms . | |
| 4,560,180 | 12/1985 | Ulmer . | |
| 5,199,600 | 4/1993 | Fietsam .............................. | 211/41.2 X |
| 5,265,893 | 11/1993 | Ettlin .................................. | 280/33.992 |
| 5,322,171 | 6/1994 | Pingelton et al. .................. | 211/207 X |

*Primary Examiner*—Brian L. Johnson
*Assistant Examiner*—Avraham H. Lerner
*Attorney, Agent, or Firm*—Gene Scott; Patent Law & Venture Group

[57] ABSTRACT

A shopping cart has a vertically movable horizontal shelf that is normally positioned near the upper rim of the basket of the cart. The shelf is spring biased so that as it becomes loaded with shopping items, it tends to move downwardly within the basket. The upwardly oriented unloaded position of the shelf allows the cart to be nested with another such cart for storage. The shelf is mounted to the front wall of the cart on a pair of spaced apart telescoping tracks with springs biasing the shelf in the upward position. As the shelf is unloaded it tends to move upwardly thereby making it easier to unload the shopping cart.

14 Claims, 2 Drawing Sheets

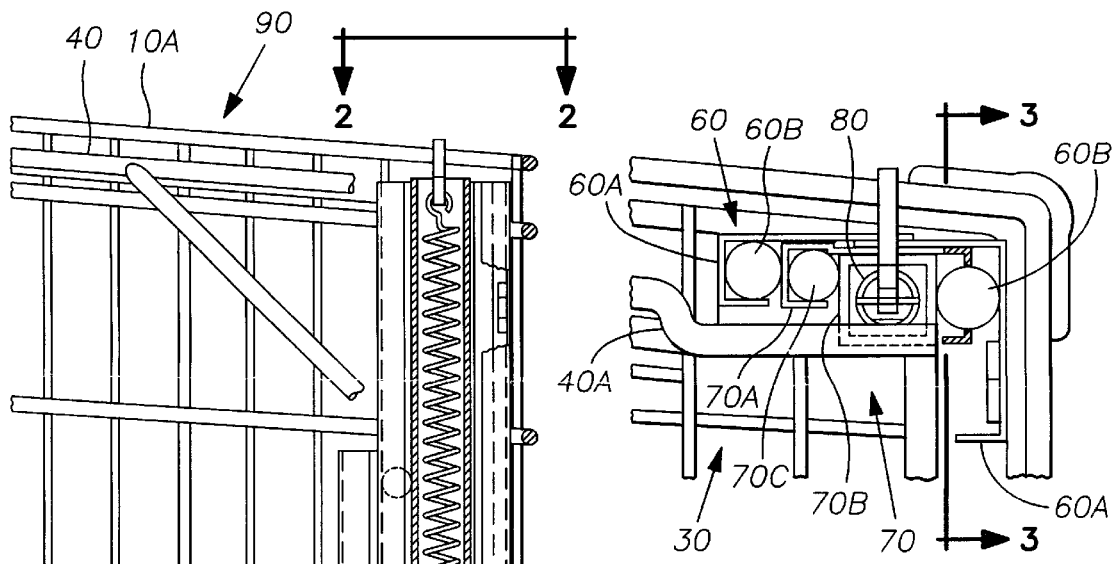
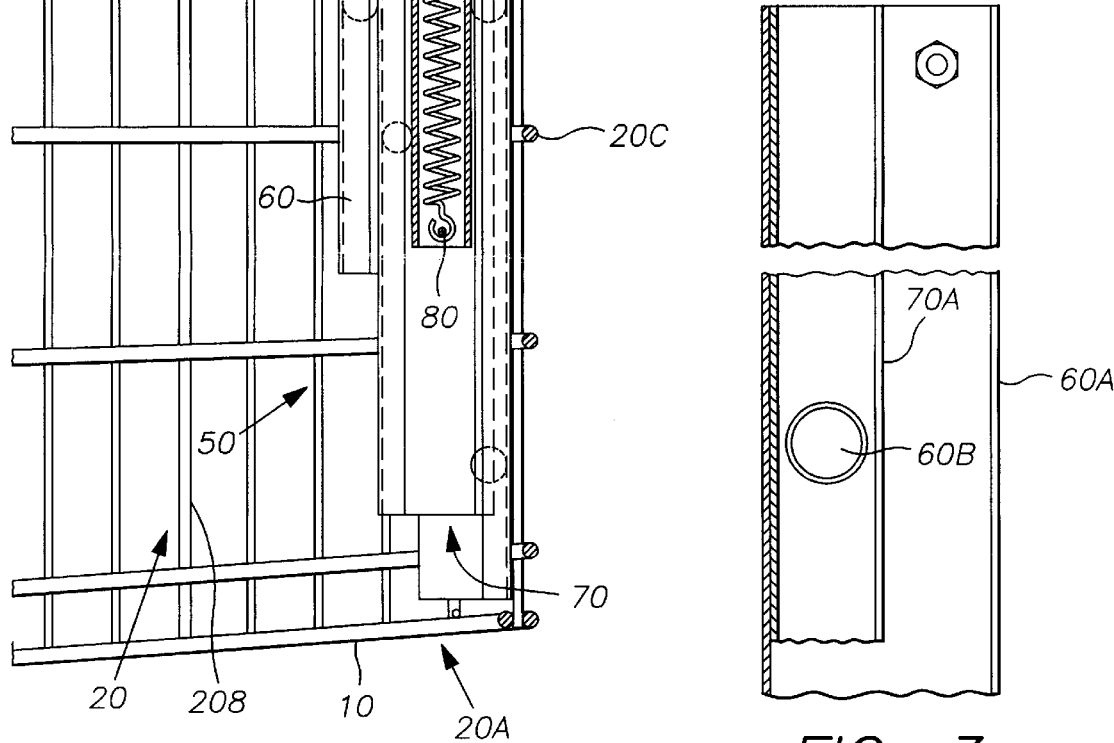
FIG. 1
FIG. 2
FIG. 3

GROCERY CART PLATFORM LIFT

BACKGROUND OF THE INVENTION

1. Field of the Invention

This invention relates generally to shopping carts, and more particularly to a shopping cart having an improved method of loading and unloading the cart through the use of a movable shelf.

2. Description of Related art

The following art defines the present state of this field:

Nicholl et al., U.S. Pat. No. 2,812,187 describes a nestable shopping cart with a movable bottom. This invention provides an improvement to shopping carts which the basket component may be expanded for added capacity without interfering with the ability of the carts to be nested together when not in use.

Young, U.S. Pat. No. 2,958,536 describes a telescoping grocery cart having a moveable bottom. This invention provides a means for increasing the loading capacity of the conventional telescoping cart by the provision of means for moving one or more of the walls of the cart outwardly from the normal lines of the cart structure as the lading is placed therein.

Oliver, U.S. Pat. No. 3,787,063 describes a shopping cart having a container adapted to receive articles therein, and having also wheels enabling the cart to be propelled along the aisles of a supermarket or similar establishment. The cart includes wheel-equipped frame structure having a container supported thereby for selective angular displacements between a generally horizontal position of use and a generally vertical position in which a plurality of carts can be disposed in successive juxtaposition with frame and container portions of one cart nested within frame and container portions of an adjacent cart. The container has a movable bottom wall displaceable between retracted and extended positions in accordance with the magnitude of the weight supported at any time by the bottom wall, thereby making the chamber defined by the container automatically expandable to accommodate the size of the load placed therein by a shopper, and automatically retractable as such load is removed therefrom to facilitated unloading of the chamber at the check out counter of such market. The movable bottom wall is floatingly supported so that it will not bind if subjected to asymmetrical loading.

Close, U.S. Pat. No. 3,456,763 describes an invention related to a shopping cart and associated apparatus to assist unloading of said cart. The shopping cart includes a basket having a liftable tray covering the bottom thereof. The tray may be raised as the basket is being unloaded to lift goods in the basket to the level of the checkout stand and the top of the basket wall. Elevating means are connected to the tray for raising same to render the goods supported thereon accessible for unloading.

Ettlin, U.S. Pat. No. 5,265,893 describes a planar, rigid structure intended to provide a removable, horizontal division of the interior of a four wheeled wire frame grocery cart. A flat, rigid structure, dimensioned for the particular manufacture of cart, possesses a member for obtaining support from at least one of the several pairs of opposed longitudinal bars found in the standard wire frame cart construction. The member enables positioning of the shelf by abutment of one side of said shelf against one interior side of the cart while holding the opposed side of the shelf from a position above the level of abutment and then simply releasing.

Ruttenberg et al., U.S. Pat. No. 3,437,176 describes a grocery cart with an inclined bottom having a front opening gate system. This invention relates to an automatic cart unloading system utilizing a wheeled cart which has a substantially inclined bottom wall sloping downwardly toward the front of the cart and a frontwardly opening gate system. The shopping cart is designed to be used with a check stand having a substantially depressed zone therein and open at one end. A conveyor system is disposed in the depressed zone. The counter is further provided with means for holding a shopping cart against the open end of the check stand and with means for opening the gate on the shopping cart. Thus, when a cart is so held and its gate so opened the goods in the shopping cart will gravitationally slide out of the cart onto the conveyor system.

McConnaughhay, U.S. Pat. No. 3,513,944 describes a shopping cart unloading apparatus for facilitating ready unloading of grocery carts or merchandise shopping carts of self service stores. The apparatus includes means for elevatingly tilting or bodily lift-tilting a shopping cart so that its fore and aft axis is tilted downwardly. The apparatus includes a pivotally liftable carriage adapted to coactingly receive and lift a shopping cart. The carriage includes reach structure for pivotally moving a shopping cart in an upwardly sweeping arc thereby lift-tilting the basketed merchandise within easy reach of the checkout cashier.

Swanson, U.S. Pat. No. 3,924,709 describes an unloading assembly for shopping carts, which assembly moves the contents of the cart from the cart onto a stand, which stand may contain a scanner head for reading the prices on the individual items moved from the cart and across the top of the stand. Movement of the contents of the cart is accomplished by a belt which is positioned in the bottom of the basket of the cart and trained over a pair of spaced idler rollers, there being driving means carried by the stand whereby a pair of driven rollers of the driving means may be brought into engagement with the conveyor belt and one of the idler rollers and thus drive the belt and move the contents of the basket therefrom and onto the stand. An elevating mechanism may be provided on the stand to vertically shift the driving means and the cart to a position where the bottom of the cart basket is aligned with the top of a stand when the top of the stand is initially at a greater heights then the bottom of the basket.

Celms, U.S. Pat. No. 4,118,044 describes a gate construction for a shopping cart basket wherein a gate panel is disposed between sidewalls of the basket for closing an end thereof. The gate panel has its lower edge pivotally supported on a pair of brackets mounted to the sidewalls adjacent the lower comers thereof. A latch structure coacts between the sidewalls and the upper corners of the gate for holding the gate in a closed position.

Ulmer, U.S. Pat. No. 4,560,180 describes a shopping cart of the over-the-counter type that includes front gates that slide under the basket of the shopping cart for storage purposes. The gate bumpers that are constructed and defined to permit the slide-under action are interlocked with the front gate to prevent the ready theft of the front gate from the shopping cart. The front gate is provided with a positive latch to the basket to further prevent the unintentional opening of the gate. The baby seat compartment has a gate that may be pivoted forwardly and rearwardly as well as an upright back supporting position. The shopping cart is constructed of a single frame element for supporting the basket and baby compartment and functioning as a cart handle. The basket is pivotally supported on the frame element to permit it to be swung rearwardly to a storage position over the baby seat compartment. The forces transmitted to the baby seat compartment for elevating the basket are transmitted to the handle rather than the baby seat compartment.

The prior art teaches various apparatus for improving the loading and unloading of a shopping cart. However, the prior art does not teach a vertically movable shelf, mounted to move in accordance with shelf loading on a pair of spaced apart telescoping tracks, so as to make the unloading of items in the cart easier. The present invention fulfills these needs and provides further related advantages as described in the following summary.

SUMMARY OF THE INVENTION

The present invention teaches certain benefits in construction and use which give rise to the objectives described below. The present invention provides a shopping cart with a vertically movable horizontal shelf that is normally positioned near the upper rim of the basket of the cart. The shelf is spring biased so that as it becomes loaded with shopping items, it tends to move downwardly within the basket. The upwardly oriented unloaded position of the shelf allows the cart to be nested with another such cart for storage of the carts. The shelf is mounted to the front wall of the cart on a pair of spaced apart telescoping tracks with springs biasing the shelf in the upward position. As the shelf is unloaded it tends to move upwardly thereby making it easier to unload the shopping cart.

Therefore it is a primary objective of the present invention is to provide a movable shelf for a shopping cart that provides the advantage of being bias into an upward position in the cart, so as to make the loading and unloading of the items placed into the cart easier.

Another objective of the present invention is to provide such a shelf in a shopping cart that is mounted forward in the cart and rests, when unloaded, in a position that does not hamper the cart from being nested with other such carts.

A further objective of the present invention is to provide a mounting means for the shelf of the invention such that the shelf is robustly supported over its entire length of travel.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a side elevational view of the preferred embodiment of the present invention in partial cross-section, and showing details of the shelf mounting and moving means of the invention, the shelf being shown in its rest position;

FIG. 2 is a partial view thereof taken from FIG. 1 along line 2—2, and showing the manner in which the shelf of the invention is attached to a tube of the invention;

FIG. 3 is a partial cross-sectional view thereof taken along line 3—3 of FIG. 2.

DETAILED DESCRIPTION OF THE PREFERRED EMBODIMENT

Figure 4:
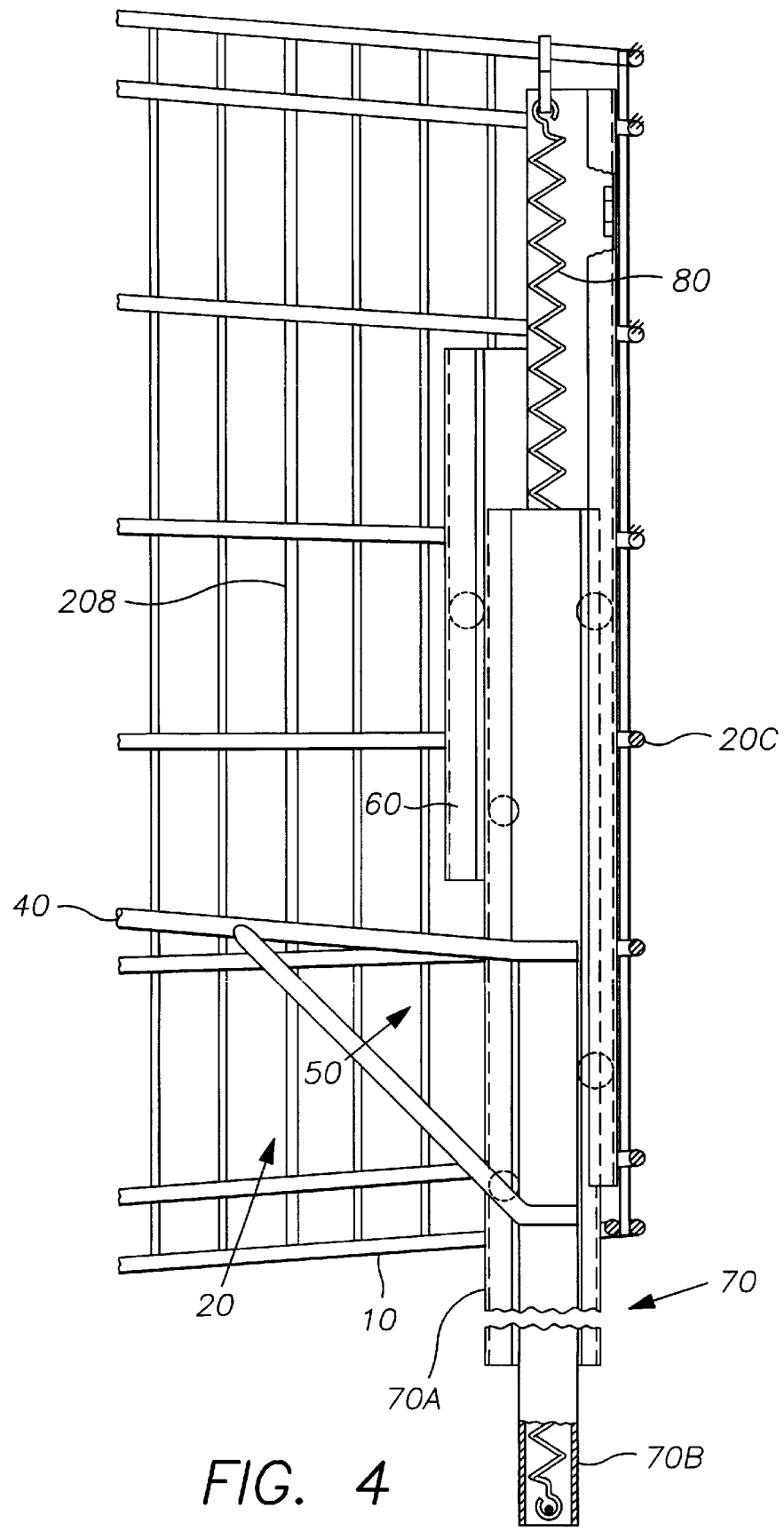
FIG. 4 is a side elevational view thereof similar to that as shown in FIG. 1, the shelf being shown in its loaded position.

The above described drawing figures illustrate the invention, a shopping cart apparatus for hauling shopping items. The apparatus comprises a basket 10 such as is found in most food and general merchandise establishments. The basket 10 preferably has a wall means 20 for containing items selected during shopping. The most common form of such a basket 10 is a generally rectangular shaped container with a horizontal floor 20A, two opposing side walls 20B, a forward wall 20C and a rearward wall (not shown) in opposition to the forward wall 20C. The side 20B, forward 20C and rearward walls 20D are generally contiguous, i.e., for an enclosure, and are preferably fabricated from rigid steel wire stock as shown in FIGS. 1, 2 and 4. However, the present invention will provide the above advantages and objects when used with other types of carts with other constructional types and materials.

Further, the invention has a shelf means 30 for supporting items selected during shopping, or for supporting other types of items in non-shopping applications. The shelf means 30 comprises a shelf 40, preferably made of the same wire construction as the cart itself, but is not limited to such. The shelf 40 is fitted within the basket 10 between the sidewall means 20, and provides a shelf side edge 40A. The side edge 40A is peripheral to the shelf 40 and therefore defines the lateral extent, or size, of the shelf 40, and it is of such size as to easily fit into the basket 10 between its side walls 20B, for instance.

A means for mounting 50 of the shelf 40 to the sidewall means 20 is provided, so that the shelf 40 is vertically movable on the mounting means 50 relative to the sidewall means 20. Such a mounting means 50 preferably comprises a vertically oriented first track means 60 fixed to the sidewall means 20, and a vertically oriented second track means 70 in vertical sliding telescopic engagement with the first track means 60 so that the second track means 70 is positionable over a range of vertical movement within the basket 10. The shelf 40 is joined to the second track means 70, as for instance, by welding interconnection or by hardware fasteners, and is movable with it. A bias means 80 is engaged with the second track means 70 and the sidewall means 20 for positioning the shelf 40, at a first shelf position 90 as shown in FIG. 1, when the shelf 40 is not loaded. This position 90 is preferably adjacent to, or just below, the upper rim 10A of the basket 10. The shelf 40 is also positionable at a second shelf position 100, as shown in FIG. 4, below the first shelf position 90, e.g., when the shelf is loaded. The second shelf position 100 is determined by the total weight of the items (not shown) placed upon the shelf 40. In other words, the items placed on the shelf 40 cause it to move downwardly, as the bias means 80, preferably a coil spring as shown in FIG. 1, extends to accommodate the weight of the items.

The mounting means 50 is preferably fixed to the sidewall means 20 of the shopping cart at a position near the front of the cart. In the case where the cart basket 10 has a generally rectangular shape, with a horizontal floor 20A, two side walls 20B, and a forward wall 20C, as described above, the preferred position of the mounting means 50 is on the forward wall 20C of the basket 10. The shelf 40 is preferably tilted toward the forward wall 20C of the cart so that items placed upon the shelf 40 tend to move toward the forward wall 20C of the cart rather then away from it. In this preferred configuration, the shelf 40 is cantilevered from the forward wall 20C and preferably has a upwardly extending rear lip (not shown) to constrain items on the shelf 40.

In order to facilitate an appropriate range of motion for the shelf 40 within a standard grocery cart basket 10, as well as to assure appropriate strength to the shelf-mount system as described, it is preferred to have the first track means 60 comprise an outer elongate U-shaped bracket means 60A as shown in FIG. 2, with the second track means 70 riding within the bracket means 60A on a first bearing means 60B, preferably ball bearings. In the preferred embodiment the second track means 70 includes an inner elongate U-shaped bracket means 70A positioned within the outer bracket means 60A, and an elongate tube means 70B, positioned within the inner bracket means 70A, as best seen in FIG. 2. Tube means 70B rides on laterally opposing first and second bearing means 60B and 70C, and inner bracket means 70A rides on laterally opposing first bearing means 60B. Mounting means 50 preferably includes two spaced apart portions to which shelf 40 is attached. Bias means 80 is preferably mounted within tube means 70B so that it is safely excluded from items in and around the cart which might engage it causing it to malfunction.

As tube means 70B, to which is mounted the shelf 40, moves vertically, inner bracket means 70A also moves vertically and in the same direction. However, bracket means 70A moves at a slower rate than does the tube means 70B. In this way, the tube means 70B is well supported over its full range of vertical travel.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A shopping cart apparatus for hauling shopping items, the apparatus comprising:

a basket having a sidewall means, and within the basket:
   a shelf means for supporting the items, the shelf means comprising:
      a shelf, fitted within the basket between the sidewall means, and having a shelf side edge, the side edge defining the lateral extent of the shelf;
      a means for mounting the shelf to the sidewall means, the shelf vertically movable on the mounting means relative to the sidewall means, the mounting means comprising:
         a vertically oriented first track means fixed to the sidewall means;
         a vertically oriented second track means in vertical sliding telescopic engagement within the first track means, said telescopic engagement functional for enabling the second track means to extend outwardly from the first track means so that the second track means is positionable over a range of vertical movement within and below the basket, the shelf being joined to the second track means and movable therewith;
         a bias means engaged with the second track means and the sidewall means for positioning the shelf, at a first shelf position when the shelf is unloaded, and at a second shelf position, below the first shelf position when the shelf is loaded, the second shelf position being determined by the total weight of the shopping items placed upon the shelf.

2. The apparatus of claim 1 wherein the mounting means is fixed to the sidewall means of the shopping cart at a position near a front of the cart.

3. The apparatus of claim 2 wherein the shelf is tilted toward the front of the cart so the shopping items placed upon the shelf tend to move toward the front of the cart.

4. The apparatus of claim 1 wherein the first track means comprises an outer elongate U-shaped bracket means, the second track means riding within the bracket means on a first bearing means.

5. The apparatus of claim 4 wherein the second track means includes an inner elongate U-shaped bracket means positioned within the outer bracket means and an elongate tube means positioned within the inner bracket means, the tube means riding on laterally opposing first and second bearing means positioned laterally thereto respectively.

6. The apparatus of claim 5 wherein the bias means is enclosed within the tube means and extensible therein.

7. The apparatus of claim 7 wherein the bias means is at least one coil spring.

8. A movable shelf apparatus for a shopping cart having a basket with a sidewall means, the apparatus comprising:
   a shelf means for supporting shopping items, the shelf means comprising:
      a shelf, for fitting within the basket between the sidewall means, and having a shelf side edge, the side edge defining the lateral extent of the shelf;
      a means for mounting the shelf to the sidewall means, the shelf vertically movable on the mounting means relative to the sidewall means, the mounting means comprising:
         a vertically oriented first track means fixable to the sidewall means;
         a vertically oriented second track means in vertical sliding telescopic engagement within the first track means, said telescopic engagement functional for enabling the second track means to extend outwardly from the first track means so that the second track means is positionable over a range of vertical movement within and below the basket, the shelf being joined to the second track means and movable therewith;
      a bias means engaged with the second track means and engagable with the sidewall means for positioning the shelf, at a first shelf position when the shelf is unloaded, and at a second shelf position, below the first shelf position when the shelf is loaded, the second shelf position being determined by the total weight of the shopping items placed upon the shelf.

9. The apparatus of claim 8 wherein the mounting means is fixable to the sidewall means of the shopping cart at a position near a front of the cart.

10. The apparatus of claim 9 wherein the shelf is tilted toward the front of the cart so the shopping items placed upon the shelf tend to move toward the front of the cart.

11. The apparatus of claim 9 wherein the first track means comprises an outer elongate U-shaped bracket means, the second track means riding within the bracket means on a first bearing means.

12. The apparatus of claim 11 wherein the second track means includes an inner elongate U-shaped bracket means positioned within the outer bracket means and an elongate tube means positioned within the inner bracket means, the tube means riding on laterally opposing first and second bearing means positioned laterally thereto respectively.

13. The apparatus of claim 12 wherein the bias means is enclosed within the tube means and extensible therein.

14. The apparatus of claim 13 wherein the bias means is at least one coil spring.

* * * * *